United States Patent
Sugatoor et al.

(10) Patent No.: US 10,143,025 B2
(45) Date of Patent: Nov. 27, 2018

(54) NEIGHBORING NETWORK DEVICES

(71) Applicant: Aruba Networks, Inc., Sunnyvale, CA (US)

(72) Inventors: Manaswini Lakshmikanth Sugatoor, Bangalore (IN); Pradeep Iyer, San Jose, CA (US); Gopal Agarwal, Bangalore (IN); Brijesh Kumar Yadav, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 116 days.

(21) Appl. No.: 15/338,058

(22) Filed: Oct. 28, 2016

(65) Prior Publication Data
US 2018/0124844 A1 May 3, 2018

(51) Int. Cl.
*H04W 76/14* (2018.01)
*H04W 4/021* (2018.01)
*H04W 4/08* (2009.01)
*H04W 24/02* (2009.01)
H04W 16/18 (2009.01)

(52) U.S. Cl.
CPC .......... *H04W 76/14* (2018.02); *H04W 4/021* (2013.01); *H04W 4/08* (2013.01); *H04W 24/02* (2013.01); H04W 16/18 (2013.01)

(58) Field of Classification Search
CPC ............... H04L 1/0001; H04L 41/0816; H04L 41/0886; H04W 72/082; H04W 84/18
See application file for complete search history.

(56) References Cited

U.S. PATENT DOCUMENTS

| 2013/0331114 A1 | 12/2013 | Gormley et al. |
| 2014/0036787 A1 | 2/2014 | Sachin et al. |
| 2015/0055563 A1* | 2/2015 | Zhu ............... H04W 52/243 370/329 |

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE, USA.
Wi-Fi Alliance, "Wi-Fi Peer-to-Peer (P2P) Technical Spec. V. 1.5", Aug. 4, 2014, 13 pages, WiFi Alliance, USA.
Wi-Fi Alliance, "Wi-Fi Certified Wi-Fi Direct: Personal, portable Wi-Fi to connect devices anywhere, anytime", Sep. 2014 8 pages, WiFi Affiance USA.
IEEE Computer Society, "IEEE Standard for Air Interface for Broadband Wireless Access Systems; IEE Std 802.16-2012", Aug. 17, 2012, 3 pages, IEEE, USA.

(Continued)

*Primary Examiner* — Mansour Oveissi
(74) *Attorney, Agent, or Firm* — Brooks, Cameron & Huebsch, PLLC

(57) ABSTRACT

Example implementations relate to neighboring network devices. For example, a non-transitory computer readable medium storing instructions executable by a processing resource can cause a computer to determine a characteristic affecting a subset of a plurality of network devices. The instructions can cause the processing resource to determine that at least two of the subset of the plurality of network devices that are affected by the characteristic are neighbors. The instructions can cause the processing resource to indicate a region to be associated with each network device of the subset based on the determination that at least two of the subset of the plurality of network devices are neighbors.

17 Claims, 6 Drawing Sheets

(56) References Cited

OTHER PUBLICATIONS

Bluetooth, "Specification of the Bluetooth System", Dec. 2, 2014, 3 pages, Covered Core Package version 4.2, Bluetooth SIG Inc., USA.
IEEE Computer Society, "IEEE Standard for Local and Metropolitan Area Networks: Overview and Architecture; IEEE Std 802-2014", Jun. 12, 2014, 18 pages, IEEE, USA.
Wikipedia, https://en.wikipedia.org/wiki/Internet_Protocol, "Internet Protocol", Jan. 1, 2015, 6 pages, Wikipedia, USA.
USB Technology, http//www.usb.org/developers/docs/, "USB 3.1 Specification" Jul. 26, 2013, 37 pages, USB Implementers Forum Inc, USA.
Wikipedia, https://en.wikipedia.org/wiki/Asynchronous_Transfer_Mode, "Asynchronous Transfer Mode", Dec. 31, 2014, 11 pages, Wikipedia, USA.

\* cited by examiner

NEIGHBORING NETWORK DEVICES

BACKGROUND

A network device referred to as an access point ("AP") can be a wireless networking device used to allow Wi-Fi compliant devices to connect to a wired network. An AP can connect to a router via the wired network as a standalone device. An access point (AP) can be coupled to a wired network and provide wireless access to a number of clients. An AP can be managed and/or monitored by a controller that controls automatic adjustments of power, channels, authentication, and/or security.

DETAILED DESCRIPTION

Figure 1:
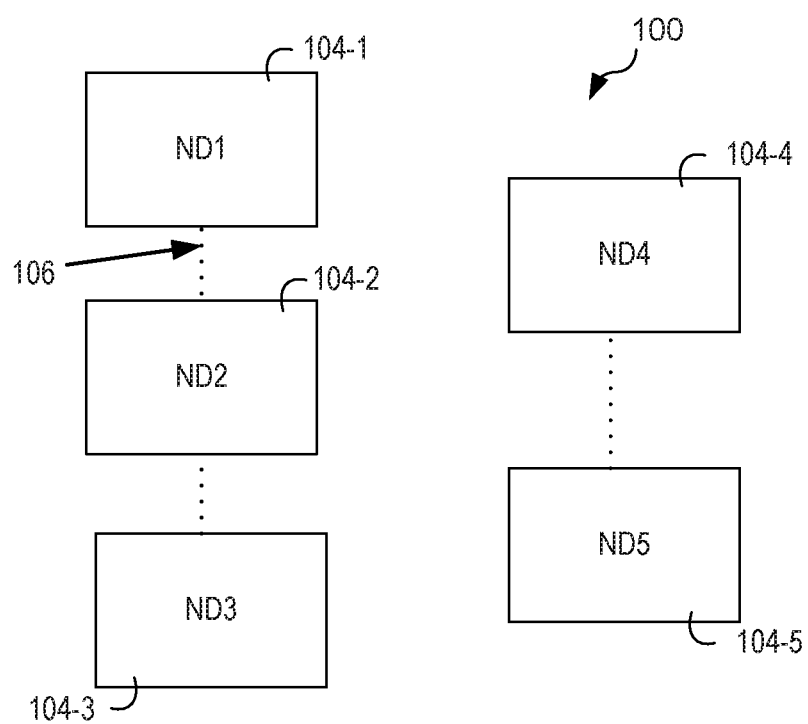
FIG. 1 illustrates an example network including neighboring network devices consistent with the present disclosure.

Wireless networks can provide various types of communication to multiple users wirelessly through the use of electromagnetic waves. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, 'wireless local area network' (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs) and/or network devices referred to as access points (APs) that may communicate over a plurality of wireless channels. An STA is a device that has the capability to use the Institute of Electrical and Electronics Engineers (IEEE) 802.11 protocol. Examples of STAs include smart phones, laptops, physical non-virtualized computing devices, personal digital assistants, etc. In some examples; a STA may be a device that contains an IEEE 802.11-conformant media access control (MAC) and physical layer (PHY) interface to a wireless medium (WM).

Wireless networks such as WLANs can use one or more wireless communication technologies, for example, orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit antennas and multiple receive antennas. WLANs such as those defined in the IEEE wireless communications standards, e.g., IEEE 802.11a, IEEE 802.11n, IEEE 802.11ac, etc. can use OFDM to transmit and receive signals. Moreover, WLANs, such as those based on the IEEE 802.11n or IEEE 802.11ac standards, can use OFDM and MIMO.

As used herein, an AP is a networking hardware device that allows a wireless-compliant device (e.g., a STA) to connect to a network. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

A network device such as an access point (AP) may provide connectivity with a network such as the internet to the STAs. As used herein, 'network device' generally includes a device that is adapted to transmit and/or receive signaling and to process information within such signaling such as a station (e.g., any data processing equipment such as a computer, cellular phone, personal digital assistant, table devices, etc.), an access point, data transfer devices (such as network switches, routers, controllers, etc.) or the like.

An access point (AP) can be coupled to a wired network and provide wireless access to a number of clients. An AP can be managed and/or monitored by a controller that controls automatic adjustments of power, channels, authentication, and/or security. A common public application of an AP can be referred to as a hotspot where a wireless client can connect to the internet independent of being aware of which particular network the wireless client is attached to. This can be beneficial for staying continually connected to the internet while moving around from location to location.

An AP can experience a number of problem conditions. In some examples, a first group of APs can experience the same problem condition. A subset of the first group of APs can be neighboring APs. For example, a first AP of the first group can be a neighbor to a second AP of the first group. By identifying which APs are experiencing a same problem condition and which of the identified APs are neighbors, regions of affected neighboring APs can be determined. The determined affected neighboring APs can be used to determine a region of affected neighboring APs. Different affected regions can be compared to determine how much affect each region is having on the overall network of APs.

FIG. 1 illustrates an example network including neighboring network devices consistent with the present disclosure. As illustrated in FIG. 1, the network 100 may include a plurality of network devices ND1 104-1, ND2 104-2, ND3 104-3, ND4 104-4, and ND5 104-5. A first network device ND1 104-1 can be a neighbor to a second network device ND2 104-2, as illustrated by dotted lines marked by arrow 106. Likewise, the second network device ND2 104-2 can be a neighbor to the first network device ND1 104-1. A third network device ND3 104-3 can be a neighbor to the second network device ND2 104-2. A fourth network device ND4 104-4 can be a neighbor to a fifth network device ND5 104-5. In contrast, the first, second, and third network devices (ND1 104-1, ND2 104-2, ND3 104-3) are not neighbors to the fourth and fifth network devices (ND4 104-4, ND5 104-5).

A characteristic can affect a subset of the plurality of network devices. A characteristic can include a problem condition and/or defect that prevents a network device from functioning in a particular way. A problem condition can include a radio of the AP reporting a high channel utilization. Channel utilization indicates how much traffic an AP can detect (e.g., "hear") on its channel. High channel utilization can refer to high usage of a channel by a number of APs. As the channel gets overused, adding additional APs does not allow for more traffic through the channel. A problem condition can include a radio reporting a high noise floor. Noise floor refers to a measure of a signal created from a sum of all the noise sources and unwanted signals within a measurement system (e.g., a system of APs). Noise is referred to as any signal other than one being monitored. A root cause of the high channel utilization and/or the high noise floor can include one of Wi-Fi interference, non-Wi-Fi interference, and high multicast.

As an example, the characteristic (e.g., problem condition) can affect a subset (such as ND1 104-1, ND2 104-2, and ND 4 104-4) of a plurality of network devices (such as ND1 104-1, ND2 104-2, ND3 104-3, ND4 104-4, and ND5 104-5). At least two of the subset of the plurality of network devices, such as ND1 104-1 and ND2 104-2, can be neighbors (illustrates by dotted line 106), ND4 104-4 is not neighbors with ND1 104-1 and ND2 104-2. Each of the network devices ND1 104-1 to ND5 104-5 can be categorized as within a particular region of a number of regions. A region indicates a number of network devices that are neighbors with at least one other network device in the region. More specifically, in this example, a region indicates a number of network devices affected by the characteristic that are neighbors with at least one other network device in the region.

For example, a determination can be made that ND1 104-1 is affected by the characteristic. The ND1 104-1 can be indicated to be in a first affected region. ND2 104-2 can be determined to be affected by the characteristic. ND2 104-2 is a neighbor of ND1 104-1 so ND2 104-2 can be indicated as being in the first region. In this example, ND3 104-3 and ND5 104-5 are not affected by the characteristic. ND 4 104-4 is affected by the characteristic but is not neighbors with either ND1 104-1 nor ND2 104-2. Therefore, ND4 104-4 is indicated as being in a second region (and not part of the first region) at this point in the determination. Each of the network devices are indicated as belonging to a particular region based on the determination of whether at least two network devices affected by the characteristic are neighbors.

Figure 2:
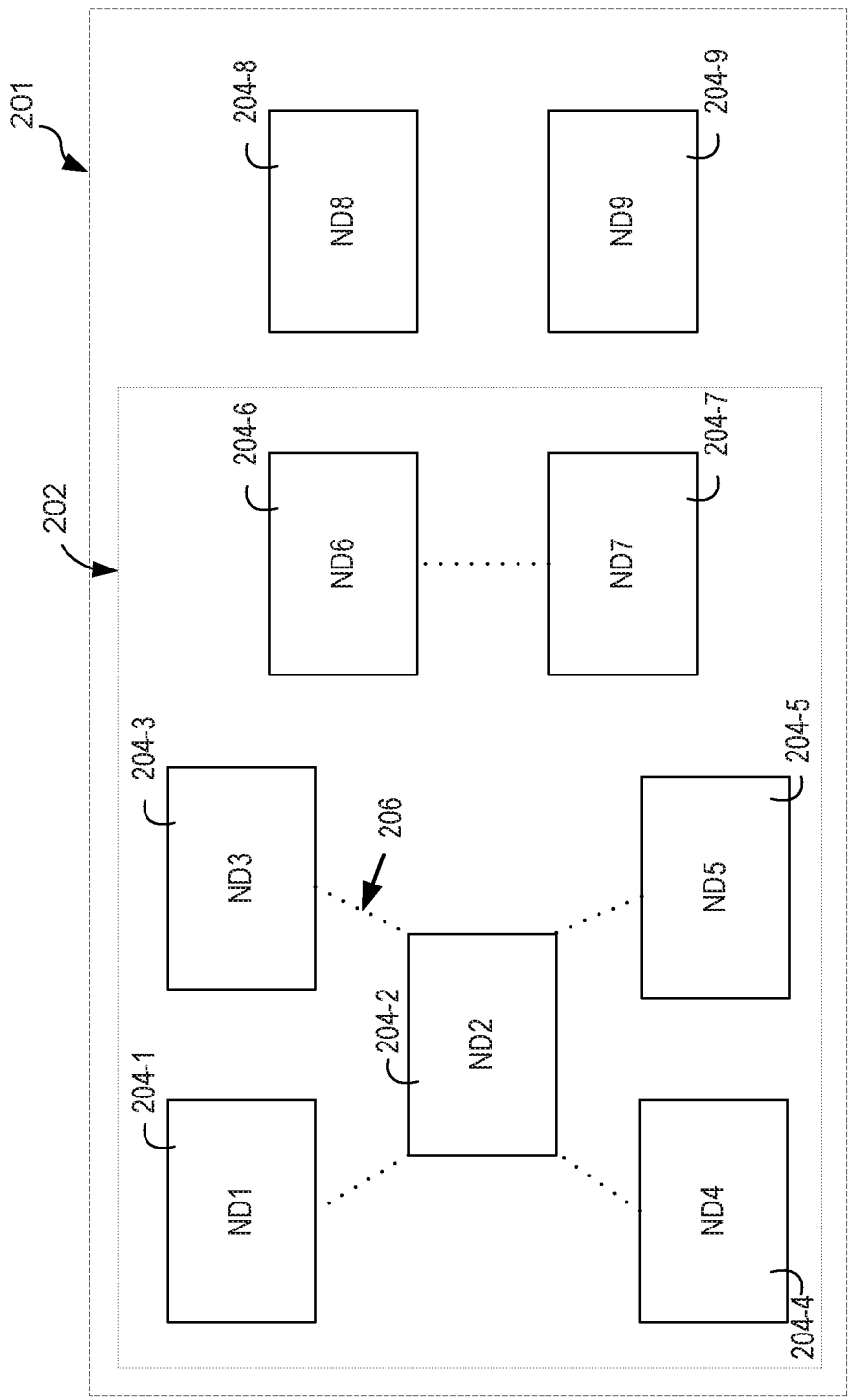
FIG. 2 illustrates an example network of network devices consistent with the present disclosure.

FIG. 2 illustrates an example network of network devices consistent with the present disclosure. A plurality of network devices 201 (which includes ND1 204-1 to ND9 204-9) can be a part of the network. The plurality of network devices 201 can be a plurality of access points (APs). A subset 202 (e.g., ND1 204-1, ND2 204-2, ND3 204-3, ND4 204-4, ND 5 204-5, ND6 204-6, ND7 204-7) of the plurality of network devices 201 (e.g., ND1 204-1 through ND9 204-9) can be affected by a characteristic (such as a problem condition). That is, ND8 204-8 and ND9 204-9 are, in this example, two network devices of a plurality of network devices 201 that are not affected by the characteristic. As described above, a characteristic can include a problem condition and/or defect that prevents a network device from functioning in a particular way (e.g., beneficially, efficiently, etc.).

A determination can be made that a number of network devices are neighbors. For example, at least a first set of two network devices, such ND2 204-2 and ND3 204-3, are illustrated as neighbors, indicated by dotted line 206. ND2 204-2 is neighbors with each of ND1 204-1, ND3 204-3, ND4 204-4, and ND5 204-5. At least a second set of two network devices, ND6 204-6 and ND7 204-7 are neighbors. In this example, ND8 204-8 and ND9 204-9 are not neighbors and they are not affected by the characteristic.

Each of the network devices ND1 204-1 through ND7 204-7 can be indicated as within a region. As described above, a region indicates a number of network devices that are neighbors with at least one other network device in the region. More specifically, in this example, a region indicates a number of network devices affected by the characteristic that are neighbors with at least one other network device in the region. For example, a first region can include ND1 204-1, ND2 204-2, ND3 204-3, ND4 204-4, ND5 204-5 as they are all neighbors with at least one other network device in the first region. A second region can include ND6 204-6 and Nd7 204-7 as those two network devices are neighbors of each other.

A determination of which region a network device is within can be performed on a network device by network device basis. For example, ND1 204-1 can be compared to ND2 204-2 to determine if they are neighbors. In response to them being neighbors, an indication that ND1 204-1 and ND2 204-2 are neighbors results in ND1 204-1 and ND2 204-2 being in a first region (e.g., [ND1, ND2], each region indicated by brackets "[ ]"). ND3 204-3 can be compared to ND1 204-1 and ND2 204-2 to determine if any of them are neighbors. ND3 204-3 is a neighbor to ND2 204-2, so ND3 204-3 is considered within the first region (e.g., [ND1, ND2, ND3]). ND4 204-4 can be compared to ND1 204-1, ND2 204-2, and ND3 204-3 and is determined to be neighbors with ND2 204-2 and is within the first region (e.g., [ND1, ND2, ND3, ND4]). ND5 204-5 can be compared to ND1 204-1, ND2 204-2, ND3 204-3, and ND4 204-4 and is determined to be neighbors with ND2 204-2 and is within the first region (e.g., [ND1, ND2, ND3, ND4, ND5]). ND6 204-6 can be compared to ND1 204-1, ND2 204-2, ND3 204-3, ND4 204-4, and ND5 204-5 and is not neighbors of any of them and is indicated to be in a second region (e.g., [ND1, ND2, ND3, ND4, ND5], [ND6]). ND7 204-7 can be compared to ND1 204-1, ND2 204-2, ND3 204-3, ND4 204-4, ND5 204-5, and ND6 204-6 and is not neighbors with ND1 204-1, ND2 204-2, ND3 204-3, ND4 204-4, and ND5 204-5 but is a neighbor of ND6 204-6. Therefore, ND7 204-7 is within the second region (e.g., [ND1, ND2, ND3, ND4, ND5], [ND6, ND7]). Example code illustrating this includes:

```
Neighborhood _map {
    ND1 → [ND2]
    ND2 → [ND1, ND3, ND4, ND5]
    ND3 → [ND2]
    ND4 → [ND2]
    ND5 → [ND2]
    ND6 → [ND7]
    ND7 → [ND6]
}
Affected Regions = [List[ ]]
Problem APS Input → [ND1, ND2, ND3, ND4, ND5, ND6, ND7]
ND1 → In affected region, neighbor or not?
    Affected Regions = [[ND1]]
ND2 → In affected region, neighbor or not?
    Affected Regions = [[ND1, ND2]]
```

-continued

```
ND3 → In affected region, neighbor or not?
    Affected Region = [[ND1, ND2, ND3]]
ND4 → In affected region, neighbor or not?
    Affected Region = [[ND1, ND2, ND3, ND4]]
ND5 → In affected region, neighbor or not?
    Affected Region = [[ND1, ND2, ND3, ND4, ND5]]
ND6 → In affected region, neighbor or not?
    Affected Region = [[ND1, ND2, ND3, ND4, ND5], [ND6]]
ND7 → In affected region, neighbor or not?
    Affected Region = [[ND1, ND2, ND3, ND4, ND5], [ND6, ND7]]
Output →    Region 1 → [ND1, ND2, ND3, ND4, ND5]
            Region 2 → [ND6, ND7]
```

In some examples, an order that the network devices are determined in can affect whether a merge operation performed subsequent to the output affects a number of regions. For example, when ND1 204-1 is determined first, then ND3 204-3 is determined second, two regions would be formed as ND1 204-1 and ND3 204-3 are not neighbors. Likewise if ND4 204-4 and ND5 204-5 are determined prior to determining ND2 204-2. In all, in this example, five regions may be determined prior to a final merge operation if the order is ND1, ND3, ND4, ND5, ND6, ND7, ND2. The below pseudocode illustrates this example:

```
Neighborhood _map {
    ND1 → [ND2]
    ND2 → [ND1, ND3, ND4, ND5]
    ND3 → [ND2]
    ND4 → [ND2]
    ND5 → [ND2]
    ND6 → [ND7]
    ND7 → [ND6]
}
Affected Regions = [List[ ]]
Problem APS Input → [ND1, ND3, ND4, ND5, ND6, ND7, ND2]
ND1 → In affected region, neighbor or not?
    Affected Regions = [[ND1]]
ND3 → In affected region, neighbor or not?
    Affected Regions = [[ND1], [ND3]]
ND4 → In affected region, neighbor or not?
    Affected Region = [[ND1], [ND3], [ND4]]
ND5 → In affected region, neighbor or not?
    Affected Region = [[ND1], [ND3], [ND4]]
ND6 → In affected region, neighbor or not?
    Affected Region = [[ND1], [ND3], [ND4], [ND5], [ND6]]
ND7 → In affected region, neighbor or not?
    Affected Region = [[ND1], [ND3], [ND4], [ND5], [ND6, ND7]]
ND2 → In affected region, neighbor or not?
    Affected Region = [[ND1, ND2], [ND3, ND2], [ND4, ND2],
        [ND5, ND2], [ND6,ND7]]
Merge → [[ND1, ND2, ND3, ND4, ND5], [ND6, ND7]]
Output →    Region 1 → [ND1, ND2, ND3, ND4, ND5]
            Region 2 → [ND6, ND7]
```

As illustrated by the example above, when ND7 is being determined, there are five total regions as ND2 has not been factored in and is the neighbor to each of ND1, ND3, ND4, and ND5 that forms those networks devices into one region instead of four separate regions. For this reason, the merge operation is performed subsequent to each output to insure that too many regions are not output.

Network device neighbor information can be derived from an ap_neighbors_message from an AMON feed. As used herein, 'information' is generally defined as data, address, control, management (e.g., statistics) or any combination thereof. For transmission, information may be transmitted as a message, names a collection of bits in a predetermined format. One type of message, namely a wireless message, includes a header and payload data having a predetermined number of bits of information. The wireless message may be placed in a format as one or more packets, frames, or cells.

A list of problem network devices can be returned as a list of bssids from which is formed a neighborhood and/or affected region. If a size of the problem network devices is "n," a size of the affected regions can range from 1 (in which case is the best case where all problem network devices are neighbors or neighbors of neighbors) to "n" (which is the worst case where no network devices are connected and each network device forms a region).

Figure 3:
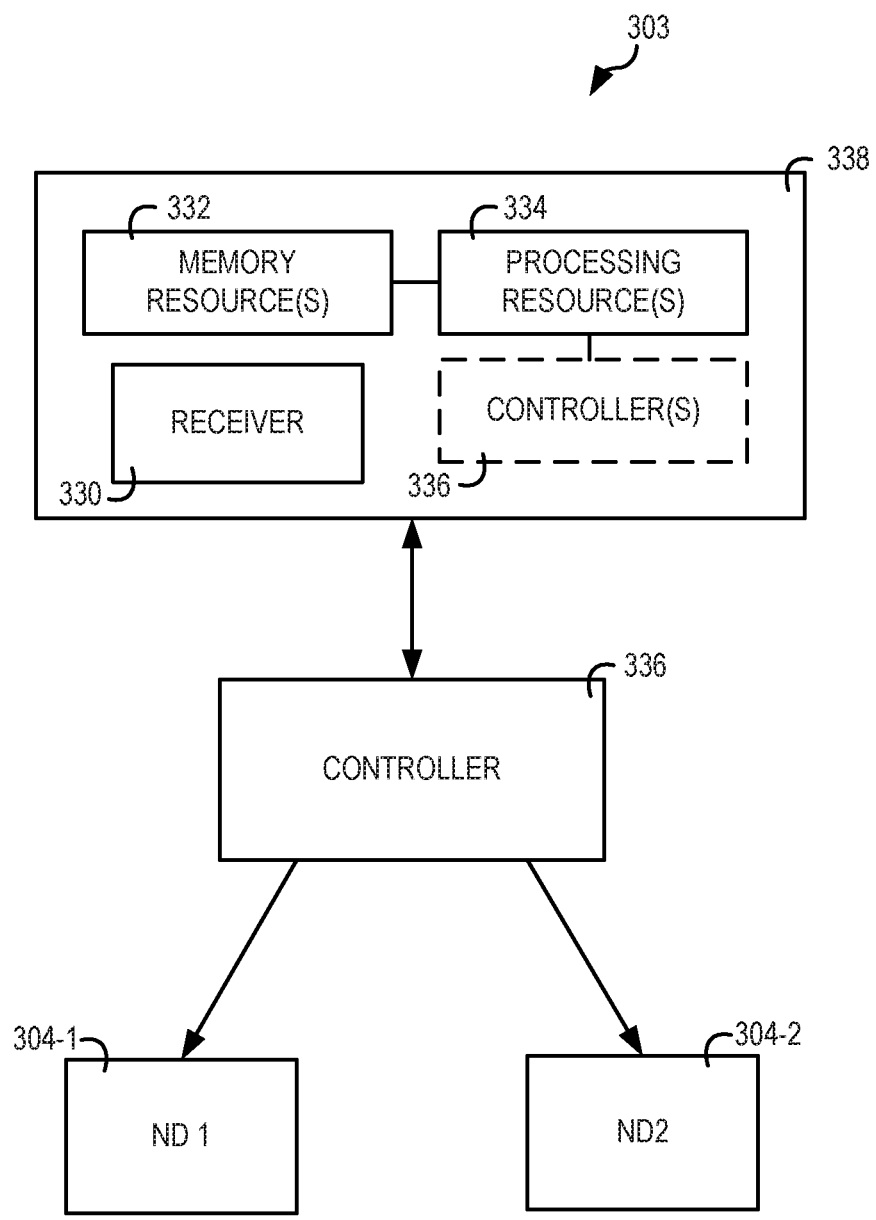
FIG. 3 illustrates an example diagram of a network system consistent with the present disclosure.

FIG. 3 illustrates an example diagram of a network system 303 consistent with the present disclosure. As shown in FIG. 3, the network system 303 may include an access point manager 338 (such as an access point manager), a controller 336, and a number of network devices (e.g., access points) ND1 304-1, ND2 304-2. The access point manager 338 can include a receiver 330, a memory resource(s) 332, processing resource(s) 334 (and, optionally, indicated by a dotted box, a controller 336 within the access point manager). By way of example, the memory resource(s) 332 may include volatile and/or non-volatile memory, and the processing resource(s) 334 may include processors, microprocessors, etc.

In some examples, the processing resource(s) 334 and/or controller(s) 336 may process and/or control data received from the network devices ND1 304-1, ND2 304-2. The memory resource 332 can be used to store data related to regions of affected network devices. The memory resource 332 can be used to store instructions executed by the processing resource 334 to perform a number of region determinations as described herein. A receiver 330 of the access point manager 338 can receive data from the network devices ND1 304-1, ND2 304-2 associated with characteristics affecting them and/or neighbor information.

In some examples, the processing resource(s) 334 and/or controller(s) 336 may determine a characteristic affecting a subset of a plurality of network devices. The processing resource(s) 334 and/or controller(s) 336 may determine that at least a first two of the subset are neighbors. The processing resource(s) 334 and/or controller(s) 336 may determine that at least a second two of the subset are neighbors. The processing resource(s) 332 and/or controller(s) 336 may indicate which of a number of regions that each of the plurality of network devices are within based on the neighbor determination.

Figure 4:
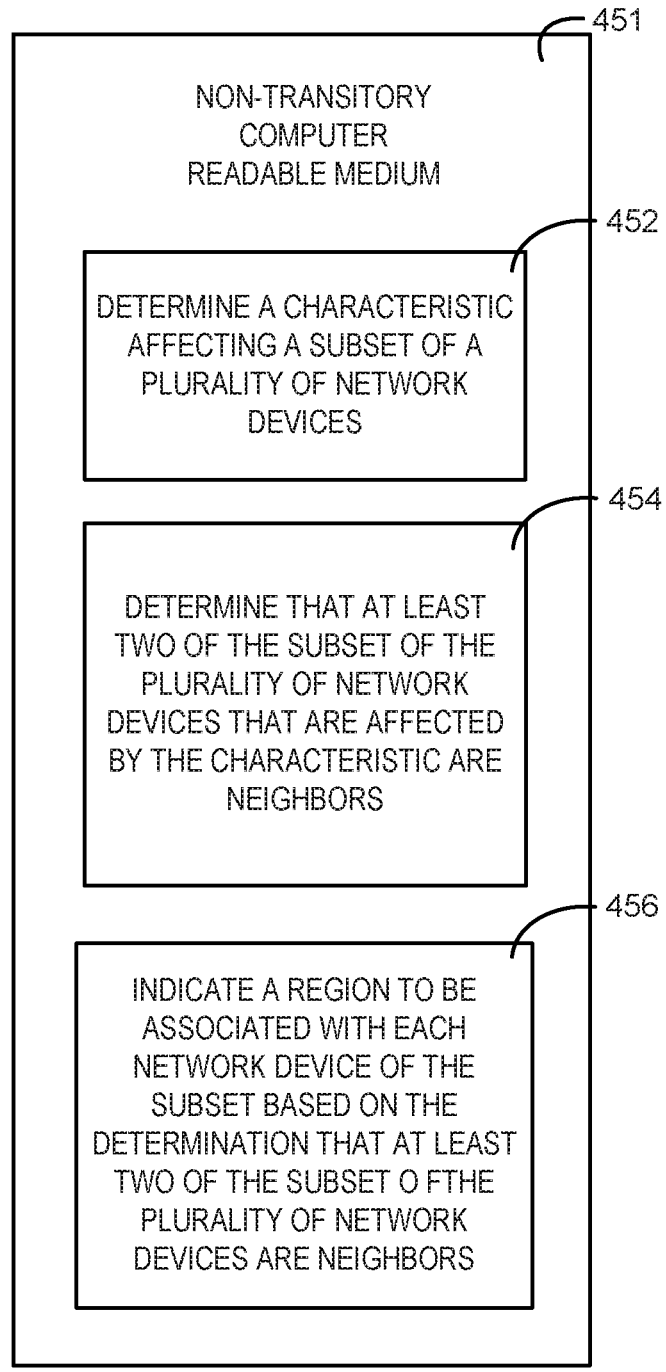
FIG. 4 illustrates a diagram of an example of a non-transitory computer readable medium and processing resource consistent with the present disclosure.

FIG. 4 illustrates a diagram of an example of a non-transitory computer readable medium 451 consistent with the present disclosure. A processing resource (such as processing resource 334 in FIG. 3) may execute instructions stored on the non-transitory machine readable medium 451. The non-transitory machine readable medium 451 may be any type of volatile or non-volatile memory or storage, such as random access memory (RAM), flash memory, read-only memory (ROM), storage volumes, a hard disk, or a combination thereof.

The example medium 451 may store instructions 452 executable by a processing resource to determine a characteristic affecting a subset of a plurality of network devices (such as access points). In some examples, the characteristics can include a number of problems and/or issues experienced by the subset of network devices. The number of problems and/or issues can be affecting access to the network devices by a number of clients.

In some examples, the example medium 451 may store instructions 454 executable by a processing resource to determine that at least two of the subset of the plurality of network devices that are affected by the characteristic are neighbors. While two network devices are mentioned in this example, examples are not so limited. For example, any number of network devices of the subset can be neighbors with any number of other network devices of the subset.

The example medium 451 may store instructions 456 executable by a processing resource to indicate which of a number of regions that each of the plurality of network devices are within based on the neighbor determination. The indication can be performed by comparing a first network device to a second network device, the first and second network devices to a third network device, and so forth, to determine which are neighbors. For a group of network devices that are neighbors, the group will be indicated to be in a same region. A region with a greatest number of network devices can be indicated to determine which region of network devices may be having the greatest affect on the overall system of network devices (e.g., access points having the greatest affect on the wireless network).

Figure 5:
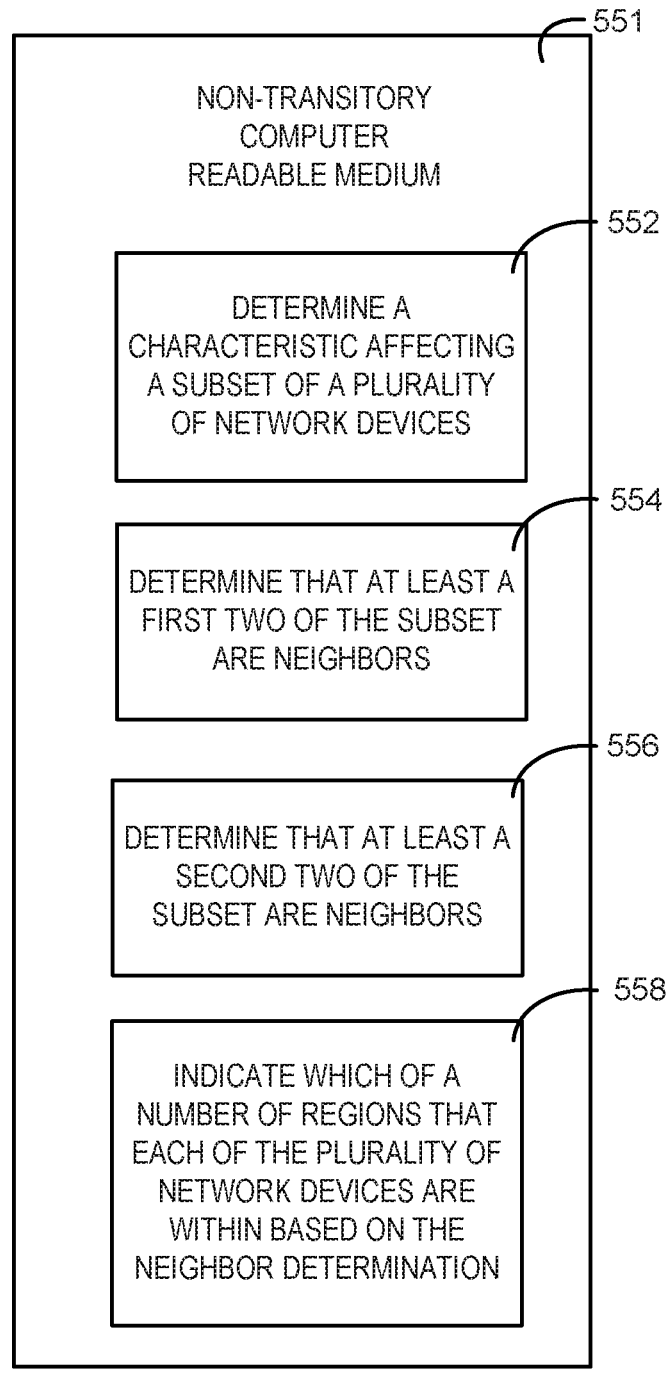
FIG. 5 illustrates a flow diagram for an example method for neighboring network devices consistent with the present disclosure.

FIG. 5 illustrates a diagram of an example of a non-transitory computer readable medium 551 consistent with the present disclosure. A processing resource (such as processing resource 334 in FIG. 3) may execute instructions stored on the non-transitory machine readable medium 551. The non-transitory machine readable medium 551 may be any type of volatile or non-volatile memory or storage, such as random access memory (RAM), flash memory, read-only memory (ROM), storage volumes, a hard disk, or a combination thereof.

The example medium 551 may store instructions 552 executable by a processing resource to determine a characteristic affecting a subset of a plurality of network devices (such as access points). In some examples, the characteristics can include a number of problems and/or issues experienced by the subset of network devices. The number of problems and/or issues can be affecting access to the network devices by a number of clients.

In some examples, the example medium 551 may store instructions 554 executable by a processing resource to determine that at least a first two of a subset of network devices are neighbors. While two network devices are mentioned in this example, examples are not so limited. For example, any number of network devices of the subset can be neighbors with any number of other network devices of the subset.

In some examples, the example medium 551 may store instructions 556 executable by a processing resource to determine that at least a second two of the subset are neighbors. While two network devices are mentioned in this example, examples are not so limited. For example, the first two of the subset mentioned above may, in some examples, be any quantity including 2, 3, 4, 5, etc. of network devices and the second two of the subset may be any quantity including 2, 3, 4, 5, etc.

The example medium 551 may store instructions 558 executable by a processing resource to indicate which of a number of regions that each of the plurality of network devices are within based on the neighbor determination. The indication can be performed by comparing a first network device to a second network device, the first and second network devices to a third network device, and so forth, to determine which are neighbors. For a group of network devices that are neighbors, the group will be indicated to be in a same region. A region with a greatest number of network devices can be indicated to determine which region of network devices may be having the greatest affect on the overall system of network devices (e.g., access points having the greatest affect on the wireless network). For example, a number of access points in a region of neighboring access points can be referred to as a blast radius. The region with the greatest number of network devices can be the region with the largest blast radius.

Figure 6:
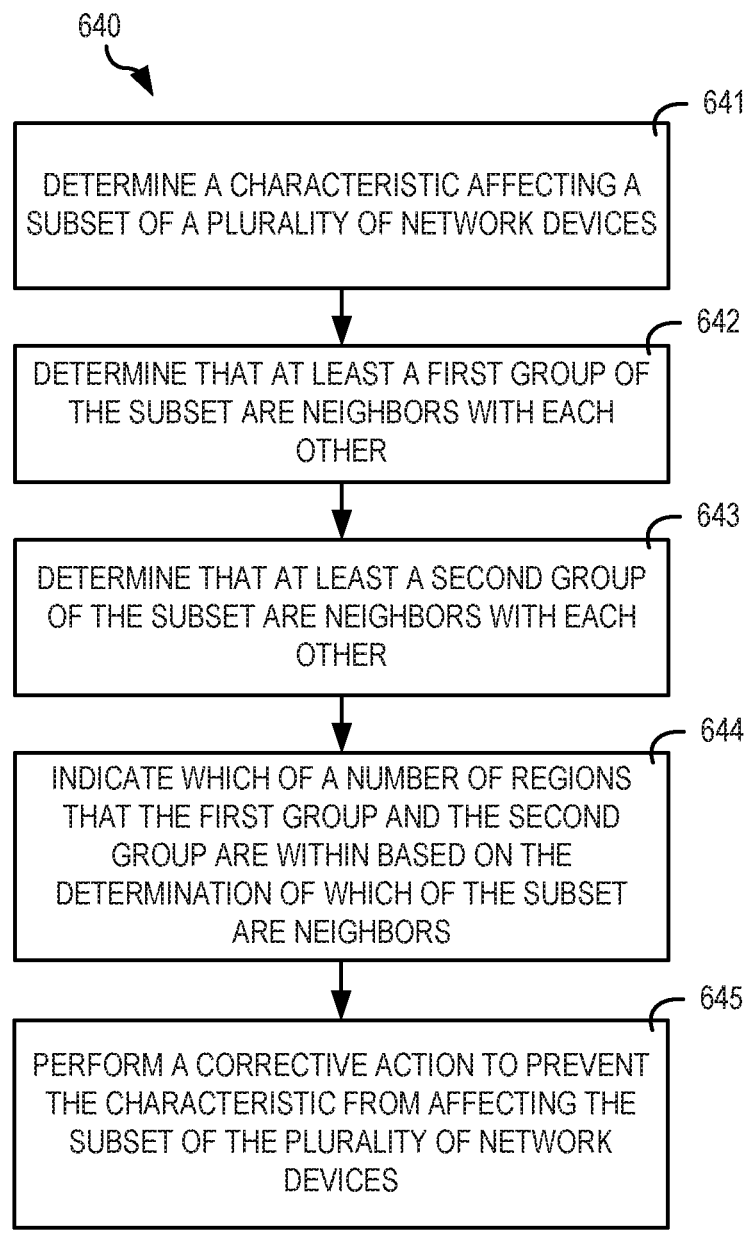
FIG. 6 illustrates a flow diagram for an example method for neighboring network devices consistent with the present disclosure.

FIG. 6 illustrates a flow diagram for an example method 640 for neighboring network devices consistent with the present disclosure. At 641, the method 640 includes determining a characteristic affecting a subset of a plurality of network devices. At 642, the method 640 includes determining that at least a first group of the subset are neighbors with each other. At 643, the method 640 includes determining that at least a second group of the subset are neighbors with each other. At 644, the method 640 includes indicating which of a number of regions that the first group and the second group are within based on the determination of which of the subset are neighbors. At 645, the method 640 includes performing a corrective action to prevent the characteristic from affecting the subset of the plurality of network devices.

In some examples, the method 640 includes determining a greater number of regions than is the case. For example, the method can include comparing a plurality of network devices in a particular order such that the network devices are indicated to be within more regions than are present in the list of network devices. In this example, the method 640 includes merging a number of network devices from being within different regions to being in a same region based on at least one network device being a neighbor to at least one network device to both regions.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "R", "S", and "T", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:
1. A non-transitory, computer readable medium storing instructions which, when executed by a processing resource, cause a computer to:
   determine a characteristic of a radio-frequency environment in a wireless local area network, the wireless local area network comprising a subset of network devices;

determine that at least two network devices of the subset of network devices are within a same radio-frequency environment;

indicate a first region to be associated with each network device of the subset of network devices based on a determination that at least two of the subset of network devices are neighbors; and merge the first region with a second region to identify a new region including a combined subset of network devices affected by the characteristic of the radio-frequency environment in the wireless local area network.

2. The non-transitory, computer readable medium of claim 1, wherein the instructions are executable by the processing resource to perform a corrective action to prevent the characteristic from affecting the subset of network devices.

3. The non-transitory, computer readable medium of claim 2, wherein the instructions are executable by the processing resource to perform the corrective action in response to a quantity of the network devices that exhibit a large value of the characteristic.

4. The non-transitory, computer readable medium of claim 1, wherein the characteristic comprises one of a higher utilization and a higher noise floor compared to a network device that is not in the subset of network devices.

5. The non-transitory, computer readable medium of claim 4, wherein a root cause of the characteristic comprises Wi-Fi interference and a higher multicast compared to a network device that is not in the subset of network devices.

6. The non-transitory, computer-readable medium of claim 1, wherein the second region comprises a second subset of the network devices and shares at least one network device with the first region.

7. The non-transitory, computer-readable medium of claim 1, wherein the characteristic comprises one of a channel interference, a noise floor, or a channel utilization.

8. A non-transitory, computer readable medium storing instructions which, when executed by a processing resource cause a computer to:

determine a characteristic of a radio-frequency environment in a wireless local area network, the wireless local area network comprising a subset of network devices;

determine that:

at least a first two network devices of the subset of network devices are within a same radio-frequency environment; and at least a second two network devices of the subset of network devices are neighbors;

indicate a first region from a number of regions that each of the network devices are within based on a neighbor determination; and merge the first region with a second region to identify a new region including a combined subset of network devices affected by the characteristic of the radio-frequency environment in the wireless local area network.

9. The non-transitory, computer readable medium of claim 8, wherein the instructions are executable to indicate that a first two network devices of the subset of network devices are in a first region and a second two network devices of the subset of network devices are in a second region and none of the network devices in the first region are in the second region.

10. The non-transitory, computer readable medium of claim 8, wherein the instructions are executable to indicate at least one of the first two network devices of the subset of network devices is a neighbor with at least one of the second two network devices of the subset of network devices.

11. The non-transitory, computer readable medium of claim 10, wherein the instructions are executable to indicate that the first two network devices of the subset of network devices and the second two network devices of the subset of network devices are in a same region.

12. The non-transitory, computer readable medium of claim 8, wherein the instructions are executable to: determine that at least a third two network devices of the subset of network devices are neighbors; and indicate that the first two network devices of the subset of network devices are in a first region, the second two network devices of the subset of network devices are in a second region, and the third two network devices of the subset of network devices are in a third region.

13. The non-transitory, computer readable medium of claim 12, wherein the instructions are executable to indicate that none of the first two network devices, the second two network devices, and the third two network devices are neighbors.

14. A method, comprising:

determining a characteristic of a radio-frequency environment in a wireless local area network, the wireless local area network comprising a subset of network devices; determining that:

at least a first group of the subset of network devices are neighbors with each other; and at least a second group of the subset of network devices are neighbors with each other; and indicating a first region from a number of regions that the first group of the subset of network devices and the second group of the subset of network devices are within based on the determination which of the subset of network devices are neighbors;

merging the first region with a second region to identify a new region including a combined subset of network devices affected by the characteristic of the radio-frequency environment in the wireless local area network; and performing a corrective action to prevent the characteristic from spreading to the subset of network devices.

15. The method of claim 14, comprising:

determining that at least one of the first group and at least one of the second group are neighbors; and indicating that the first group and the second group are in a same region.

16. The method of claim 14, comprising:

determining that there is not one of the first group and not one of the second group that are neighbors; and indicating that the first group is in a first region and the second group is in a second region.

17. The method of claim 16, comprising determining that the first group includes more network devices than the second group.

* * * * *